(12) United States Patent
He

(10) Patent No.: US 12,489,950 B2
(45) Date of Patent: Dec. 2, 2025

(54) PLAYBACK CONTROL

(71) Applicant: Shanghai Bilibili Technology Co., Ltd., Shanghai (CN)

(72) Inventor: Zhe He, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 320 days.

(21) Appl. No.: 18/134,880

(22) Filed: Apr. 14, 2023

(65) Prior Publication Data
US 2023/0336828 A1 Oct. 19, 2023

Related U.S. Application Data

(63) Continuation of application No. PCT/CN2021/119990, filed on Sep. 23, 2021.

(30) Foreign Application Priority Data

Dec. 23, 2020 (CN) .......................... 202011540524.1

(51) Int. Cl.
H04N 21/472 (2011.01)

(52) U.S. Cl.
CPC ............................ *H04N 21/47217* (2013.01)

(58) Field of Classification Search
None
See application file for complete search history.

(56) References Cited

U.S. PATENT DOCUMENTS

| 9,760,631 | B1 | 9/2017 | Broxton et al. |
| 2010/0275121 | A1* | 10/2010 | Johnson ............... G11B 27/036 715/726 |
| 2013/0163962 | A1 | 6/2013 | Young |
| 2014/0123195 | A1 | 5/2014 | Han et al. |

(Continued)

FOREIGN PATENT DOCUMENTS

| CN | 101763439 A | 6/2010 |
| CN | 102143225 A | 8/2011 |

(Continued)

OTHER PUBLICATIONS

International Search Report with a mailing date of Dec. 7, 2021, in International application No. PCT/CN2021/119990, filed on Sep. 23, 2021 (4 pages).

(Continued)

*Primary Examiner* — Heather R Jones
(74) *Attorney, Agent, or Firm* — McAndrews, Held & Malloy, Ltd.

(57) ABSTRACT

A playback control method is provided. The method includes: receiving a playback rate control instruction submitted by a user for a to-be-processed multimedia resource, and determining playback control coordinates of any two adjacent control points carried in the playback rate control instruction; calculating playback control coordinates of a preset quantity of virtual control points between the any two adjacent control points; and determining the any two adjacent control points respectively as a start point and an end point, and drawing a playback rate control curve of a multimedia resource segment between the any two adjacent control points based on the start point, the end point, and the playback control coordinates of the preset quantity of virtual control points.

17 Claims, 6 Drawing Sheets

(56) References Cited

U.S. PATENT DOCUMENTS

| | | | |
|---|---|---|---|
| 2014/0169765 A1* | 6/2014 | Wang .................. | G11B 27/031 386/280 |
| 2015/0228094 A1 | 8/2015 | Yoo et al. | |
| 2018/0247673 A1 | 8/2018 | Yamasaki et al. | |

FOREIGN PATENT DOCUMENTS

| | | |
|---|---|---|
| CN | 101763439 B | 9/2012 |
| CN | 107221022 A | 9/2017 |
| CN | 107239216 A | 10/2017 |
| CN | 108366299 A | 8/2018 |
| CN | 108966012 A | 12/2018 |
| CN | 109309870 A | 2/2019 |
| CN | 109889918 A | 6/2019 |
| CN | 111061412 A | 4/2020 |
| CN | 111127598 A | 5/2020 |
| CN | 111294659 A | 6/2020 |
| CN | 112738627 A | 4/2021 |
| EP | 2346000 A4 | 10/2016 |
| WO | 2015071490 A1 | 5/2015 |
| WO | 2017096509 A1 | 6/2017 |

OTHER PUBLICATIONS

Zhang, Zhi-fang, et al. The Design and Realization of Multi-Channel Video Play System for AVI, Journal of System Simulation, vol. 20 Suppl., Sep. 2008 (5 pages).

Wu, Yinchi, Adjustment of Speed of materials in AE6.0, China Academic Journal Electronic Publishing House, Feb. 20, 2007 (3 pages).

European Patent Office, EESR for EP Patent Application No. 21908691.5 mailed Feb. 20, 2024 (9 pages).

\* cited by examiner

PLAYBACK CONTROL

CROSS-REFERENCE TO RELATED APPLICATIONS

This application is a continuation under 35 U.S.C. 111(a) of PCT International Application No. PCT/CN2021/119990, filed on Sep. 23, 2021, which claims priority to Chinese Patent Application No. 202011540524.1, filed with the China National Intellectual Property Administration on Dec. 23, 2020, the entire contents of which are hereby incorporated by reference in their entirety for all purpose.

TECHNICAL FIELD

Embodiments of this application relate to the field of computer technologies, and in particular, to playback control.

BACKGROUND

With increasing in user requirements and development of media technologies, a quantity of videos increases exponentially. Because features of the videos such as timeliness and diversity meet user experience during video watching, more and more video processing applications emerge accordingly. Currently, most intelligent terminals have a touchscreen for interaction with a user. Based on the touchscreen, a user can not only implement a tap-touch operation, for example, enable an application by tapping an icon of the application, but also perform operations such as video clipping.

SUMMARY

Some embodiments of this application provides a playback control method, a computing device, and a non-transitory computer-readable storage medium.

According to a first aspect of the embodiments of this application, a playback control method is provided, including:

receiving a playback rate control instruction submitted by a user for a to-be-processed multimedia resource, and determining playback control coordinates of any two adjacent control points carried in the playback rate control instruction, where the control point is used to control a playback rate of a corresponding resource frame in the to-be-processed multimedia resource;

calculating playback control coordinates of a preset quantity of virtual control points between the any two adjacent control points; and determining the any two adjacent control points respectively as a start point and an end point, and drawing a playback rate control curve of a multimedia resource segment between the any two adjacent control points based on the start point, the end point, and the playback control coordinates of the preset quantity of virtual control points.

According to a second aspect of the embodiments of this application, a computing device is provided, including:

a processor; and a memory, where the memory stores computer executable instructions that, when executed by the processor, cause the processor to implement the steps of the playback control method.

According to a third aspect of the embodiments of this application, a non-transitory computer-readable storage medium is provided, where the non-transitory computer-readable storage medium stores computer executable instructions that, when executed by a processor, cause the processor to implement the steps of the playback control method.

DETAILED BRIEF DESCRIPTION OF DRAWINGS

DESCRIPTION OF EMBODIMENTS

Figure 1:
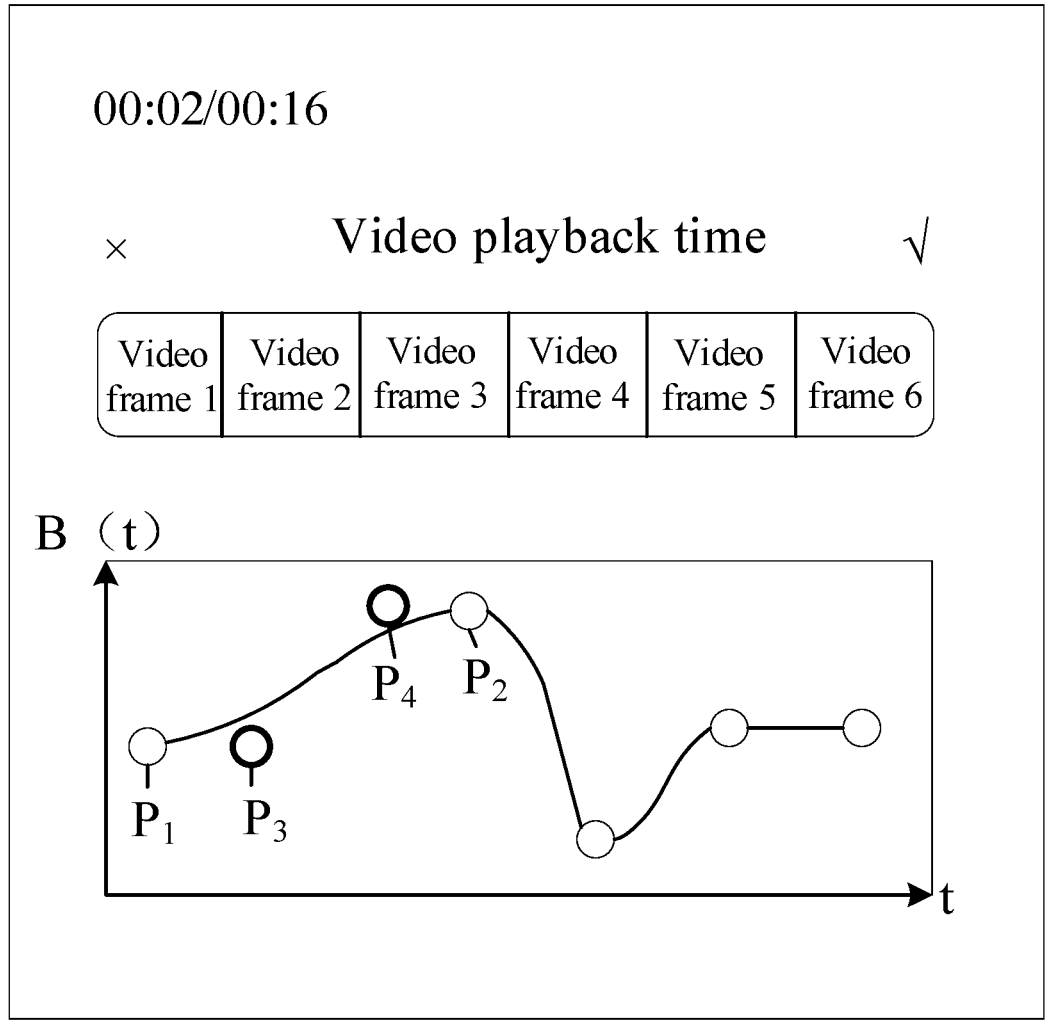
FIG. 1 is a schematic diagram of a playback control method according to some embodiments of this application.

Many specific details are described in the following descriptions to facilitate full understanding of this application. However, this application can be implemented in many different manners from those described herein. A person skilled in the art may make similar promotion without departing from the connotation of this application. Therefore, this application is not limited to the specific implementations disclosed below.

Terms used in one or more embodiments of this application are merely used to describe specific embodiments, but are not intended to limit the one or more embodiments of this application. The terms "a", "said", and "the" of singular forms used in one or more embodiments and the appended claims of this application are also intended to include plural forms, unless otherwise specified in the context clearly. It should be further understood that the term "and/or" used in one or more embodiments of this application indicates and includes any or all possible combinations of one or more associated listed items.

It should be understood that although terms such as "first" and "second" can be used in one or more embodiments of this application to describe various types of information, the information is not limited to these terms. These terms are only used to differentiate between information of a same type. For example, without departing from the scope of one or more embodiments of this application, "first" may also be referred to as "second", and similarly, "second" may also be referred to as "first". Depending on the context, for example, the word "if" used herein may be explained as "while", "when", or "in response to determining".

First, nouns related to one or more embodiments of this application are explained.

Curve variable speed: By using a series of control points, based on a third-order Bézier equation, a curve is spliced to control a video segment for variable speed playback.

A Bézier curve is a mathematical curve applied to a two-dimensional graphic application. Vector graphics software usually draws a curve accurately based on the Bézier curve. The Bézier curve consists of a line segment and a node. The node is a dragging fulcrum, and the line segment is like a scalable rubber band.

In a conventional video clipping process, a user may control a playback rate of a video by dragging a pointer on a curve variable speed panel of a terminal. In this process, the terminal needs to dynamically inversely calculate a real-time rate of the video based on a timestamp corresponding to the pointer, to control a point insertion operation and display of the playback rate. Usually, each time the pointer is dragged, thousands of step-by-step iterations are required to approximately calculate a playback rate of a corresponding video frame or video segment. In this processing manner, calculation load is high. In a real-time response scenario of fast dragging the pointer, calculation through large step-by-step iterations requires high performance of the terminal, which easily causes frame freezing of the terminal.

In view of this, the present application provides a playback control method, a computing device, and a non-transitory computer-readable storage medium, so as to resolve a possible technical disadvantage of frame freezing of a device in a conventional technology due to that in a real-time response scenario of fast dragging a pointer, real-time calculation of a playback rate through large step-by-step iterations requires high performance of the device. Details are described one by one in the following embodiments.

The playback control method provided in the embodiments of this application may be applied to any field in which a playback rate of a multimedia resource needs to be adjusted or controlled, for example, adjustment of a playback rate of a to-be-released video in a video field, adjustment of a playback rate of a to-be-released audio in an audio field, adjustment of a playback rate of a voice conversation in a communication field, and adjustment or control of a playback rate of a voice message in a we-media field. For ease of understanding, in the embodiments of this application, an example in which the playback control method is applied to adjust the playback rate of a to-be-released video in the video field is used for detailed description, but is not limited thereto.

For example, when the playback control method is applied to adjust the playback rate of a to-be-released video in the video field, a to-be-processed multimedia resource in the playback control method may be understood as a to-be-released video.

In an exemplary implementation, the to-be-processed multimedia resource in the embodiments of this application may be presented in a client, for example, a large video playback device, a game console, a desktop computer, a smartphone, a tablet computer, a moving picture experts group audio layer III (MP3) player, a moving picture experts group audio layer IV (MP4) player, a laptop computer, an e-book reader, and another display terminal.

In addition, the to-be-processed multimedia resource in the embodiments of this application may be resources such as a video or an audio generated in any application, for example, a recorded video generated in a live streaming application, a recorded video generated in a game application, a song listened online or offline, or an audio generated in a book-listening application.

FIG. 1 is a schematic diagram of a playback control method according to an embodiment of this application.

A user shoots a video by using a video shooting application of a client to generate a video A, and clips the video A in a video clipping application of the client. A schematic diagram of a video processing interface used in a process of adjusting a playback rate of each video frame in the video A is shown in FIG. 1. The user may control the playback rate of each video frame in the video A on the video processing interface displayed by the client in FIG. 1.

If the user needs to adjust playback rates of a video frame 1 to a video frame 3 on the video processing interface, the user may first set playback rates of locations corresponding to the video frame 1 and the video frame 3 by setting a first playback control point $P_1$ and a second playback control point $P_2$.

After the first playback control point $P_1$ and the second playback control point $P_2$ are set, a plane rectangular coordinate system may be established based on a location of the first playback control point $P_1$. A horizontal axis of the plane rectangular coordinate system represents time (relative time), and a vertical axis thereof represents a rate.

Further, the first playback control point $P_1$ is used as a start point, and the second playback control point $P_2$ is used as an end point. Playback control coordinates of a first virtual control point $P_3$ and a second virtual control point $P_4$ that are located between the start point and the end point are calculated based on coordinates of the first playback control point $P_1$ and the second playback control point $P_2$ in the plane rectangular coordinate system. Then, the first playback control point $P_1$, the second playback control point $P_2$, and the playback control coordinates of the first virtual control point $P_3$ and the second virtual control point $P_4$ are substituted into a third-order Bézier curve function, to obtain a playback rate control curve of a multimedia resource segment (the video frame 1 to the video frame 3) between the first playback control point $P_1$ and the second playback control point $P_2$.

The schematic diagram of the playback control method shown in FIG. 1 schematically shows only six video frames from the video frame 1 to a video frame 6. However, in actual application, the video frames shown in FIG. 1 may be discontinuous video frames. For example, the video frame 1 to the video frame 2 may be discontinuous video frames. A plurality of video frames may be included between the video frame 1 and the video frame 2, but these video frames are not shown on the interface in FIG. 1. Alternatively, the video frame 1, the video frame 2, and the video frame 3 are discontinuous video frames. In addition to the video frame 2, a plurality of video frames not shown on the interface in FIG. 1 may be further included from the video frame 1 to the video frame 3. This may be determined based on an actual requirement. This is not limited in this application.

Figure 2:
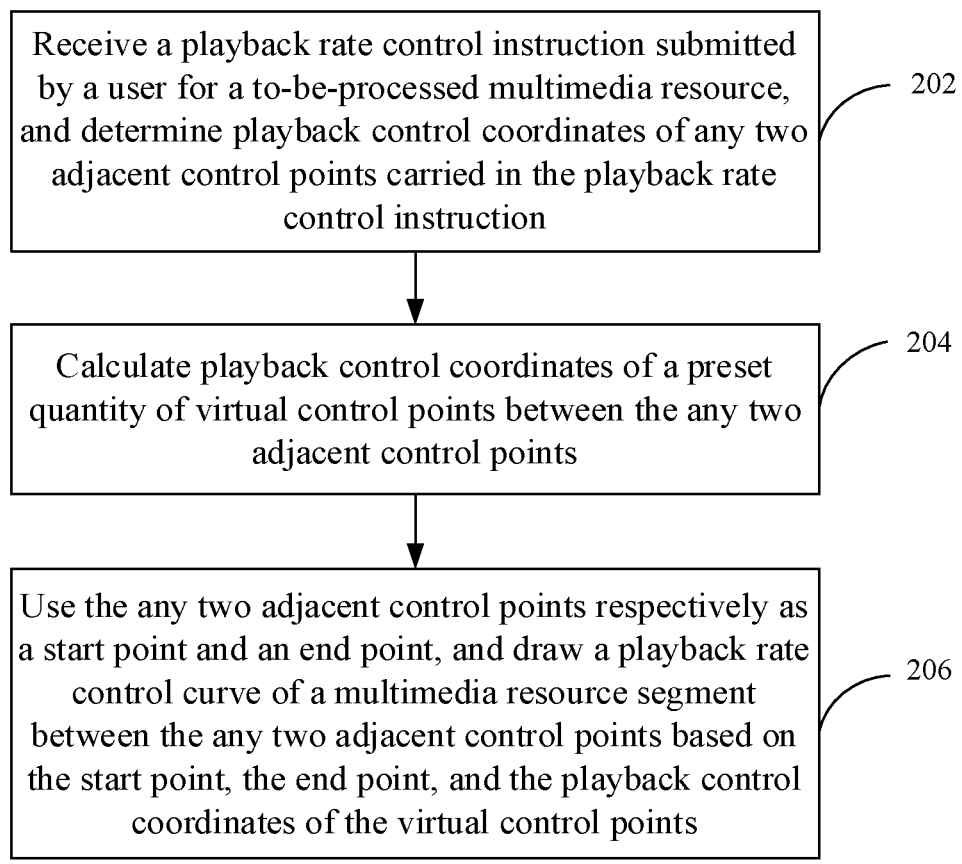
FIG. 2 is a flowchart of a playback control method according to some embodiments of this application.

FIG. 2 is a flowchart of a playback control method according to an embodiment of this application. The following steps are included.

Step 202: Receive a playback rate control instruction submitted by a user for a to-be-processed multimedia resource, and determine playback control coordinates of any two adjacent control points carried in the playback rate control instruction.

The control point is used to control a playback rate of a corresponding resource frame in the to-be-processed multimedia resource.

The user may submit the playback rate control instruction for the to-be-processed multimedia resource on a multimedia resource processing interface of a terminal. The playback rate control instruction may be submitted by setting a control point on the multimedia resource processing interface.

In actual application, the to-be-processed multimedia resource includes but is not limited to a video resource or an audio resource.

For example, the to-be-processed multimedia resource is a video resource. If the user needs to adjust a playback rate of each video frame in the video resource, adjustment may be implemented by setting a playback rate of each video frame in the video resource, or a playback rate of at least one video frame in the video resource may be set by setting a control point for the at least one video frame, and a playback rate of another video frame is calculated by using the playback rate of the at least one video frame.

In this embodiment of this application, the playback rate of at least one video frame in the video resource is set by setting a control point for the at least one video frame. In addition, the playback rate of at least one video frame is represented by a vertical coordinate in playback control coordinates of the control point. Therefore, a playback rate of a video frame corresponding to a control point can be determined by determining playback control coordinates of the control point.

In an exemplary implementation, because no coordinate system is set on an initial multimedia resource processing interface, in a use process, a location coordinate system may be established with a lower left corner of the multimedia resource processing interface as an origin, a lower boundary of the multimedia resource processing interface as a horizontal axis, and a left boundary thereof as a vertical axis. After the user submits the playback rate control instruction by setting a control point, before the playback control coordinates of the any two adjacent control points carried in the playback rate control instruction are determined, location coordinates of the any two adjacent control points on the multimedia resource processing interface are obtained. Coordinate conversion is performed on the location coordinates of the any two adjacent control points, so as to convert the location coordinates of the any two adjacent control points on the multimedia resource processing interface into the playback control coordinates.

Further, determining playback control coordinates of any two adjacent control points carried in the playback rate control instruction may be implemented in the following manner:

establishing a plane rectangular coordinate system by using the lower boundary of the multimedia resource processing interface as a horizontal axis and a straight line that is perpendicular to the horizontal axis and that passes through a first control point in the any two adjacent control points as a vertical axis, where the horizontal axis represents time, and the vertical axis represents a playback rate;

determining playback control coordinates of the first control point in the plane rectangular coordinate system, and determining a coordinate conversion relationship of a control point based on location coordinates of the first control point and the playback control coordinates; and calculating playback control coordinates of a second control point in the any two adjacent control points based on the coordinate conversion relationship and location coordinates of the second control point.

In this embodiment of this application, a Bézier curve is used to represent a playback rate of a multimedia resource segment between any two adjacent control points on the multimedia resource processing interface. After the location coordinate system is established on the initial multimedia resource processing interface, the location coordinates of the any two adjacent control points on the multimedia resource processing interface are obtained. However, an expression of a Bézier curve function is Formula (1):

$$B(t)=P_1(1-t)^3+3P_2t(1-t)^2+3P_3t^2(1-t)+P_4t^3, t\in[0,1]$$ Formula (1)

In Formula (1), t represents relative time, B(t) represents a playback rate, t is an independent variable, B(t) is a dependent variable, and $P_1$, $P_2$, $P_3$, and $P_4$ are coordinates of known control points.

Therefore, if the playback rate of the multimedia resource segment needs to be represented by using the Bézier curve, the location coordinates of the any two adjacent control points on the multimedia resource processing interface need to be converted into the playback control coordinates (the horizontal coordinate is the relative time, and the vertical coordinate is the playback rate).

Because a value of the independent variable t in the Bézier curve is 0 to 1, a coordinate system needs to be re-established for calculating a Bézier curve corresponding to a multimedia resource segment between any two adjacent control points. A plane rectangular coordinate system may be established by using the lower boundary of the multimedia resource processing interface as a horizontal axis and by using a straight line that passes through a first control point in the any two adjacent control points and that is perpendicular to the horizontal axis as a vertical axis, where the horizontal axis represents time, and the vertical axis represents a playback rate. In addition, the first control point is a control point with an earlier time in the any two adjacent control points.

After the plane rectangular coordinate system is established, playback control coordinates of the first control point in the plane rectangular coordinate system may be determined. A vertical coordinate of the first control point in the plane rectangular coordinate system needs to be determined.

In actual application, the vertical coordinate of the first control point in the plane rectangular coordinate system may be calculated based on a scaling ratio between a scale value of the vertical axis in the location coordinate system and a scale value of the vertical axis in the plane rectangular coordinate system, so as to determine the coordinate conversion relationship of the control point.

For example, if a maximum scale value of the vertical axis in the location coordinate system is 2, and a maximum scale value of the vertical axis in the plane rectangular coordinate system is 8, it may be determined that the scaling ratio between a scale value of the vertical axis in the location coordinate system and a scale value of the vertical axis in the plane rectangular coordinate system is 1:4. Therefore, if the location coordinates of the first control point are (0.5, 0.25), the playback control coordinates are (0, 1). A corresponding coordinate conversion relationship is that a vertical coordinate in playback control coordinates of a control point is expanded to 4 times of a vertical coordinate in location coordinates.

After the coordinate conversion relationship is determined, the playback control coordinates of the second control point in the any two adjacent control points may be calculated based on the coordinate conversion relationship and the location coordinates of the second control point. If the location coordinates of the second control point are (4, 2), the playback control coordinates thereof are (1, 8).

Step 204: Calculate playback control coordinates of a preset quantity of virtual control points between the any two adjacent control points.

In this embodiment of this application, the Bézier curve is used to represent the playback rate of the multimedia resource segment between the any two adjacent control points. Therefore, after the playback control coordinates of the any two adjacent control points are determined, the any two adjacent control points may be separately used as a start point and an end point, and the playback control coordinates of the preset quantity of virtual control points between the start point and the end point are calculated, so that the start point, the end point, and the playback control coordinates of the virtual control points are used to generate the playback rate to ensure the multimedia resource segment between the start point and the end point.

In an exemplary implementation, based on the playback control coordinates of the first control point and the second control point in the any two adjacent control points, playback control coordinates of a first virtual control point and a second virtual control point that are located between the first control point and the second control point are calculated.

Further, that playback control coordinates of a first virtual control point and a second virtual control point that are located between the first control point and the second control point are calculated may be implemented in the following manner:

calculating a horizontal coordinate of the first virtual control point based on a difference between horizontal coordinates in the playback control coordinates of the second control point and the first control point, and determining a vertical coordinate of the first virtual control point based on a vertical coordinate in the playback control coordinates of the first control point; and calculating a horizontal coordinate of the second virtual control point based on the difference between the horizontal coordinates in the playback control coordinates of the second control point and the first control point, and determining a vertical coordinate of the second virtual control point based on a vertical coordinate in the playback control coordinates of the second control point.

In this embodiment of this application, the third-order Bézier curve is used to represent the playback rate of the multimedia resource segment. Therefore, a curve equation of the third-order Bézier curve needs to be calculated by using four control points with known playback control coordinates.

After the playback control coordinates of the first control point and the second control point are obtained, the playback control coordinates of the first virtual control point and the second virtual control point between the first control point and the second control point may be calculated based on the playback control coordinates of the first control point and the second control point.

The horizontal coordinate of the first virtual control point is calculated based on the difference between the horizontal coordinates in the playback control coordinates of the second control point and the first control point, and the vertical coordinate of the first virtual control point is determined based on the vertical coordinate in the playback control coordinates of the first control point. The horizontal coordinate of the second virtual control point is calculated based on the difference between the horizontal coordinates in the playback control coordinates of the second control point and the first control point, and the vertical coordinate of the second virtual control point is determined based on the vertical coordinate in the playback control coordinates of the second control point.

In an exemplary implementation, the playback control coordinates of the first virtual control point are determined in the following manner:

calculating the difference between the horizontal coordinates in the playback control coordinates of the second control point and the first control point;

calculating a product of a first preset ratio threshold and the difference as the horizontal coordinate of the first virtual control point, and determining the vertical coordinate in the playback control coordinates of the first control point as the vertical coordinate of the first virtual control point; and calculating a product of a second preset ratio threshold and the difference as the horizontal coordinate of the second virtual control point, and determining the vertical coordinate in the playback control coordinates of the second control point as the vertical coordinate of the second virtual control point.

For example, the first control point and the second control point are respectively used as a start point $P_1$ and an end point $P_2$, and equal interpolation is performed on the start point $P_1$ and the end point $P_2$. If coordinates of the start point $P_1$ are $(x_1, y_1)$, and coordinates of the end point $P_2$ are $(x_2, y_2)$, a horizontal coordinate of a first virtual control point $P_3$ may be $(x_2-x_1)/3$ and a vertical coordinate thereof is $y_1$, and a horizontal coordinate of a second virtual control point $P_4$ is $(x_2-x_1) \times 2/3$ and a vertical coordinate thereof is $y_2$.

The foregoing is a schematic description of a manner of determining the playback control coordinates of the first virtual control point and the second virtual control point in this embodiment of this application. In actual application, a specific manner of determining the playback control coordinates of the first virtual control point and the second virtual control point may be determined based on an actual requirement, which is not limited herein.

Step 206: Use the any two adjacent control points respectively as the start point and the end point, and draw a playback rate control curve of the multimedia resource segment between the any two adjacent control points based on the start point, the end point, and the playback control coordinates of the virtual control points.

As described above, in this embodiment of this application, the Bézier curve is used to represent the playback rate of the multimedia resource segment. Therefore, an expression of the Bézier curve equation needs to be calculated by using the first control point as the start point, the second control point as the end point, and the first virtual control point and the second virtual control point as control points.

In an exemplary implementation, drawing a playback rate control curve of the multimedia resource segment between the any two adjacent control points based on the start point, the end point, and the playback control coordinates of the virtual control points includes: drawing, based on the start point, the end point, and the playback control coordinates of the virtual control points, a Bézier curve corresponding to the multimedia resource segment between the any two adjacent control points, and splicing and displaying each Bézier curve.

Further, the drawing, based on the start point, the end point, and the playback control coordinates of the virtual control points, a Bézier curve corresponding to the multimedia resource segment between the any two adjacent control points includes:

substituting the playback control coordinates of the any two adjacent control points and the virtual control points between the any two adjacent control points separately into a third-order Bézier curve function, to obtain the Bézier curve corresponding to the multimedia resource segment between the any two adjacent control points.

The Bézier curve is a smooth curve drawn based on coordinates of any point in four locations. The four pairs of coordinates of the known points are successively defined as $(x_1, y_1)$, $(x_2, y_2)$, $(x_3, y_3)$, and $(x_4, y_4)$. The Bézier curve needs to pass through two points: the first point and the last point, which are called endpoints. Although it is not necessary to pass through the two points in the middle, the two points are used to control a shape path of the curve, which are called control points.

Figure 3:
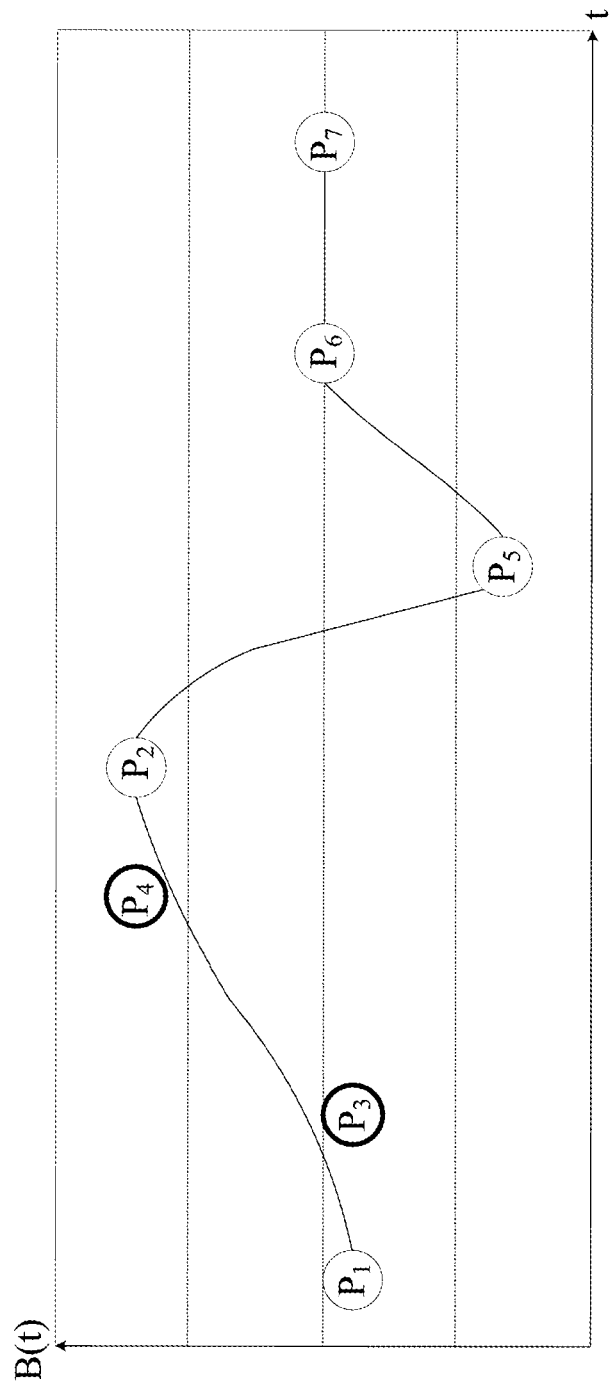
FIG. 3 is a schematic diagram of a generation process of a playback rate control curve according to some embodiments of this application.

FIG. 3 is a schematic diagram of a generation process of a playback rate control curve according to an embodiment of this application. Two adjacent control points $P_1$ and $P_2$ in FIG. 3 are used as an example. $P_1$ is the first control point (the start point), $P_2$ is the second control point (the end point), $P_3$ is the first virtual control point, and $P_4$ is the second virtual control point. If coordinates of the start point $P_1$ are $(x_1, y_1)$, coordinates of the end point $P_2$ are $(x_2, y_2)$, coordinates of the first virtual control point $P_3$ are $((x_2-x_1)/3, y_1)$, coordinates of the second virtual control point $P_4$ are $((x_2-x_1)\times 2/3, y_2)$, and the coordinates of $P_1$, $P_2$, $P_3$, and $P_4$ are substituted into another expression Formula (2) of the Bézier curve, Formula (3) used to represent a playback rate control curve of the multimedia resource segment between $P_1$ and $P_2$ can be obtained.

$$\begin{cases} x = x_1(1-t)^3 + 3x_2t(1-t)^2 + 3x_3t^2(1-t) + x_4t^3 \\ y = y_1(1-t)^3 + 3y_2t(1-t)^2 + 3y_3t^2(1-t) + y_4t^3 \end{cases} \quad \text{Formula (2)}$$

$$t \in [0, 1]$$

$$\begin{cases} x = x_1(1-t)^3 + 3x_2t(1-t)^2 + (x2-x1) \\ \quad t^2(1-t) + 2(x2-x1)t^3 \\ y = y_1(1-t)^3 + 3y_2t(1-t)^2 + 3y_1t^2(1-t) + y_2t^3 \end{cases} \quad \text{Formula (3)}$$

$$t \in [0, 1]$$

In actual application, if a playback rate of any multimedia resource frame between P1 and P2 needs to be solved, a horizontal coordinate x corresponding to the any multimedia resource frame is input into the first equation (an equation of x and t) in Formula (3), to solve a value of t. $x=x_1(1-t)^3+3x_2t(1-t)^2+(x_2-x_1)t^2(1-t)+2(x_2-x_1)t^3$ is solved as $x_1(1-t)^3+3x_2t(1-t)^2+(x_2-x_1)t^2(1-t)+2(x_2-x_1)t^3-x=0$, and the value of t is obtained by solving a solved unary cubic equation by using a Shengjin formula. Then, the solved value of t is input into the second equation (an equation of y and t) in Formula (3), and the playback rate of the any multimedia resource frame can be solved.

In addition, in actual application, processes of solving playback rate control curves of multimedia resource segments between $P_2$ and $P_3$, between $P_3$ and $P_4$, and between $P_4$ and $P_5$ are similar to a process of solving the playback rate control curve of the multimedia resource segment between $P_1$ and $P_2$. Details are not described herein.

After the playback rate control curves of the multimedia resource segments between $P_1$ and $P_2$, between $P_2$ and $P_3$, between $P_3$ and $P_4$, and between $P_4$ and $P_5$ are separately drawn, the four drawn playback rate control curves may be spliced and displayed. A specific splicing manner may be sequential connection based on a sequence relationship between the control points on the multimedia resource processing interface.

An embodiment of this application implements a playback control method and apparatus. The playback control method includes: receiving a playback rate control instruction submitted by a user for a to-be-processed multimedia resource, and determining playback control coordinates of any two adjacent control points carried in the playback rate control instruction; calculating playback control coordinates of a preset quantity of virtual control points between the any two adjacent control points; and using the any two adjacent control points respectively as a start point and an end point, and drawing a playback rate control curve of a multimedia resource segment between the any two adjacent control points based on the start point, the end point, and the playback control coordinates of the virtual control points.

According to the playback control method in this embodiment of this application, after the playback rate control instruction is received, the playback rate control curve used to represent the multimedia resource segment between the any two adjacent control points can be generated by real-time calculation based on the playback control coordinates of the any two adjacent control points, so as to adjust a playback rate of the to-be-processed multimedia resource. This improves convenience of adjusting the playback rate of the multimedia resource.

Figure 4:
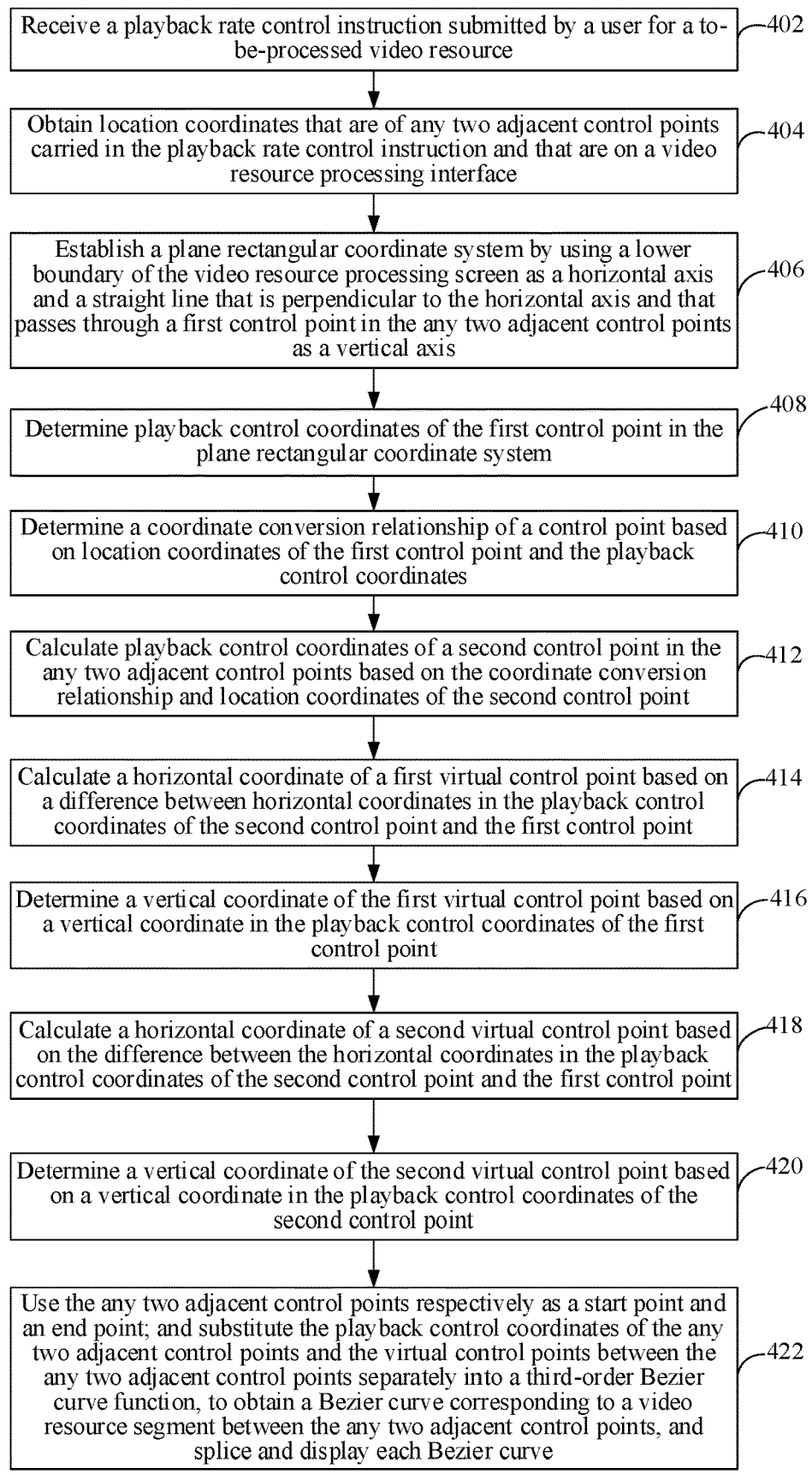
FIG. 4 is a flowchart of a process in which a playback control method is applied to adjust a video playback rate in a video field according to some embodiments of this application.

With reference to FIG. 4, the playback control method is further described by using a process in which the playback control method provided in this embodiment of this application is applied to adjust a video playback rate in a video field as an example. FIG. 4 is a flowchart of a process in which a playback control method is applied to adjust a video playback rate in a video field according to an embodiment of this application. The method includes the following steps:

Step 402: Receive a playback rate control instruction submitted by a user for a to-be-processed video resource.

Step 404: Obtain location coordinates that are of any two adjacent control points carried in the playback rate control instruction and that are on a video resource processing interface.

The control point is used to control a playback rate of a corresponding video frame in the to-be-processed video resource.

Step 406: Establish a plane rectangular coordinate system with a lower boundary of the video resource processing interface as a horizontal axis and a straight line that is perpendicular to the horizontal axis and that passes through a first control point in the any two adjacent control points as a vertical axis.

The horizontal axis represents time, and the vertical axis represents a playback rate.

Step 408: Determine playback control coordinates of the first control point in the plane rectangular coordinate system.

Step 410: Determine a coordinate conversion relationship of a control point based on location coordinates of the first control point and the playback control coordinates.

Step 412: Calculate playback control coordinates of a second control point in the any two adjacent control points based on the coordinate conversion relationship and location coordinates of the second control point.

Step 414: Calculate a horizontal coordinate of a first virtual control point based on a difference between horizontal coordinates in the playback control coordinates of the second control point and the first control point.

Step 416: Determine a vertical coordinate of the first virtual control point based on a vertical coordinate in the playback control coordinates of the first control point.

Step 418: Calculate a horizontal coordinate of a second virtual control point based on the difference between the horizontal coordinates in the playback control coordinates of the second control point and the first control point.

Step 420: Determine a vertical coordinate of the second virtual control point based on a vertical coordinate in the playback control coordinates of the second control point.

Step 422: Use the any two adjacent control points respectively as a start point and an end point; and substitute the playback control coordinates of the any two adjacent control points and the virtual control points between the any two adjacent control points separately into a third-order Bézier curve function, to obtain a Bézier curve corresponding to the video resource segment between the any two adjacent control points, and splice and display each Bézier curve.

According to the playback control method in this embodiment of this application, after the playback rate control instruction is received, a playback rate control curve used to represent the video resource segment between the any two adjacent control points can be generated by real-time calculation based on the playback control coordinates of the any two adjacent control points, so as to adjust a playback rate of the to-be-processed video resource. This improves convenience of adjusting the playback rate of the video resource.

Figure 5:
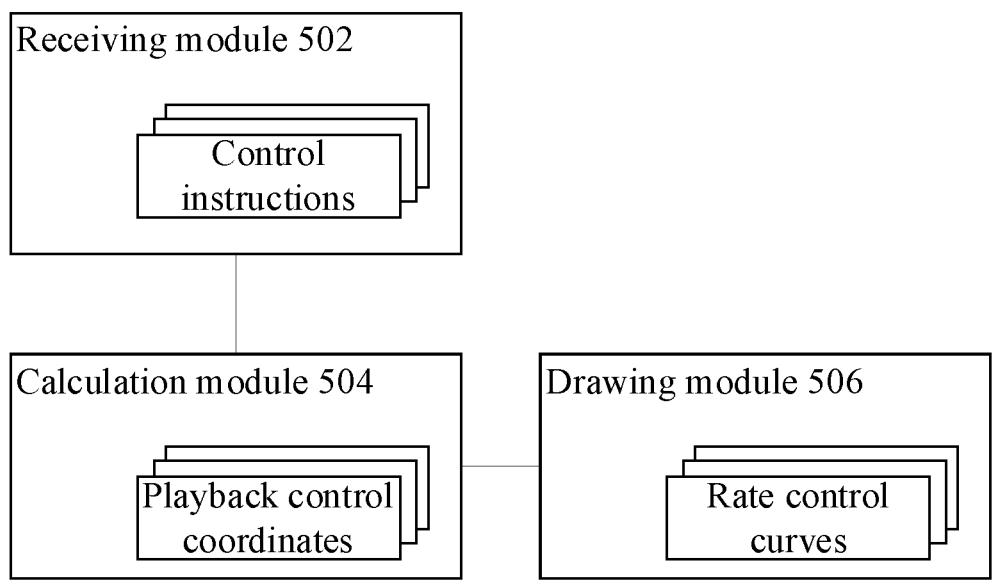
FIG. 5 is a schematic diagram of a structure of a playback control apparatus according to some embodiments of this application.

Corresponding to the foregoing method embodiments, this application further provides an embodiment of a playback control apparatus. FIG. 5 is a schematic diagram of a structure of a playback control apparatus according to an embodiment of this application. As shown in FIG. 5, the apparatus includes:

a receiving module 502, configured to receive a playback rate control instruction submitted by a user for a to-be-processed multimedia resource, and determine playback control coordinates of any two adjacent control points carried in the playback rate control instruction, where the control point is used to control a playback rate of a corresponding resource frame in the to-be-processed multimedia resource;

a calculation module 504, configured to calculate playback control coordinates of a preset quantity of virtual control points between the any two adjacent control points; and a drawing module 506, configured to use the any two adjacent control points respectively as a start point and an end point, and draw a playback rate control curve of a multimedia resource segment between the any two adjacent control points based on the start point, the end point, and the playback control coordinates of the virtual control points.

Optionally, the receiving module 502 includes: a location coordinate obtaining submodule, configured to obtain location coordinates of the any two adjacent control points on a multimedia resource processing interface; and a coordinate conversion submodule, configured to perform coordinate conversion on the location coordinates of the any two adjacent control points, to convert the location coordinates of the any two adjacent control points on the multimedia resource processing interface into the playback control coordinates.

Optionally, the receiving module 502 further includes:

a coordinate system establishment submodule, configured to establish a plane rectangular coordinate system with a lower boundary of the multimedia resource processing interface as a horizontal axis and a straight line that is perpendicular to the horizontal axis and that passes through a first control point in the any two adjacent control points as a vertical axis, where the horizontal axis represents time, and the vertical axis represents a playback rate;

a conversion relationship determining submodule, configured to determine playback control coordinates of the first control point in the plane rectangular coordinate system, and determine a coordinate conversion relationship of a control point based on location coordinates of the first control point and the playback control coordinates; and a calculation submodule, configured to calculate playback control coordinates of a second control point in the any two adjacent control points based on the coordinate conversion relationship and location coordinates of the second control point.

Optionally, the calculation module 504 includes:

a coordinate calculation submodule, configured to calculate, based on the playback control coordinates of the first control point and the second control point in the any two adjacent control points, playback control coordinates of a first virtual control point and a second virtual control point that are located between the first control point and the second control point.

Optionally, the drawing module 506 includes:

a drawing submodule, configured to draw, based on the start point, the end point, and the playback control coordinates of the virtual control points, a Bézier curve corresponding to the multimedia resource segment between the any two adjacent control points, and splice and display each Bézier curve.

Optionally, the drawing submodule includes:

a processing unit, configured to substitute the playback control coordinates of the any two adjacent control points and the virtual control points between the any two adjacent control points separately into a third-order Bézier curve function, to obtain the Bézier curve corresponding to the multimedia resource segment between the any two adjacent control points.

Optionally, the coordinate calculation submodule further includes:

a first calculation unit, configured to calculate a horizontal coordinate of the first virtual control point based on a difference between horizontal coordinates in the playback control coordinates of the second control point and the first control point, and determine a vertical coordinate of the first virtual control point based on a vertical coordinate in the playback control coordinates of the first control point; and a second calculation unit, configured to calculate a horizontal coordinate of the second virtual control point based on the difference between the horizontal coordinates in the playback control coordinates of the second control point and the first control point, and determine a vertical coordinate of the second virtual control point based on a vertical coordinate in the playback control coordinates of the second control point.

Optionally, the coordinate calculation submodule includes:

a difference calculation unit, configured to calculate the difference between the horizontal coordinates in the playback control coordinates of the second control point and the first control point; and a first coordinate determining unit, configured to use a product of a first preset ratio threshold and the difference as the horizontal coordinate of the first virtual control point, and use the vertical coordinate in the playback control coordinates of the first control point as the vertical coordinate of the first virtual control point.

Optionally, the coordinate calculation submodule further includes:

a second coordinate determining unit, configured to use a product of a second preset ratio threshold and the difference as the horizontal coordinate of the second virtual control point, and use the vertical coordinate in the playback control coordinates of the second control point as the vertical coordinate of the second virtual control point.

The foregoing describes a schematic solution of the playback control apparatus in this embodiment. It should be noted that, the technical solution of the playback control apparatus and the technical solution of the playback control method belong to a same concept. For details not described in detail in the technical solution of the playback control apparatus, refer to the descriptions of the technical solution of the playback control method.

Figure 6:
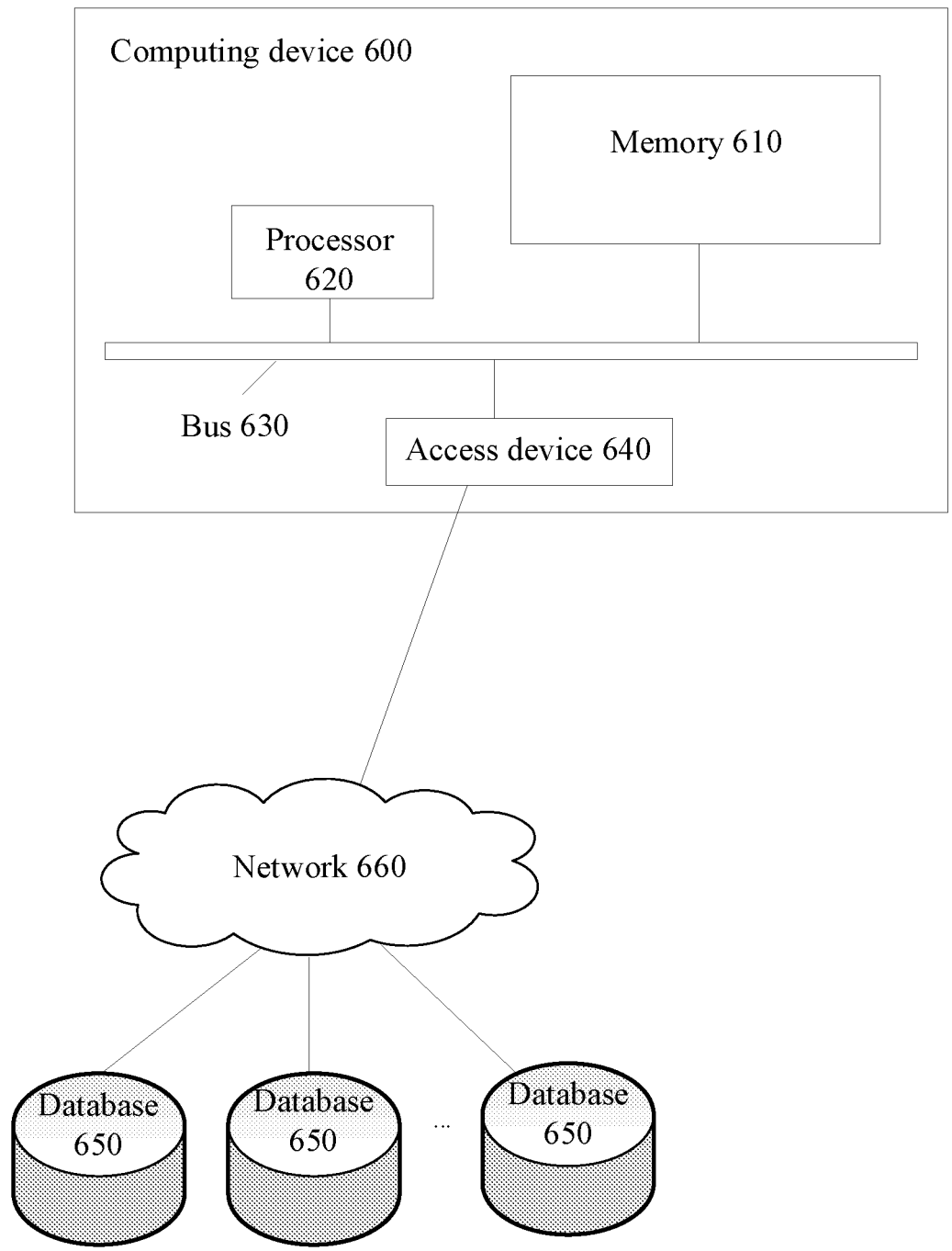
FIG. 6 is a block diagram of a structure of a computing device according to some embodiments of this application.

FIG. 6 is a block diagram of a structure of a computing device 600 according to an embodiment of this application. Components of the computing device 600 include but are not limited to a memory 610 and a processor 620. The processor 620 and the memory 610 are connected by using a bus 630, and a database 650 is configured to store data.

The computing device 600 further includes an access device 640 that enables the computing device 600 to communicate via one or more networks 660. Examples of these networks include a public switched telephone network (PSTN), a local area network (LAN), a wide area network (WAN), a private area network (PAN), or a combination of communication networks such as the Internet. The access device 640 may include one or more of any type of wired or wireless network interface (for example, a network interface card (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, or a near field communication (NFC) interface.

In an embodiment of this application, the foregoing components of the computing device 600 and other components not shown in FIG. 6 may alternatively be connected to each other, for example, by using the bus. It should be understood that the block diagram of the structure of the computing device shown in FIG. 6 is merely used as an example instead of a limitation on the scope of this application. A person skilled in the art may add or replace other components as required.

The computing device 600 may be any type of static or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), another type of mobile device, or a static computing device such as a desktop computer or a PC. The computing device 600 may alternatively be a mobile or static server.

The processor 620 is configured to execute the following computer executable instructions, and the processor implements the steps of the playback control method when executing the computer executable instructions.

The foregoing describes a schematic solution of the computing device in this embodiment. It should be noted that, the technical solution of the computing device and the technical solution of the playback control method belong to a same concept. For details not described in detail in the technical solution of the computing device, refer to the descriptions of the technical solution of the playback control method.

An embodiment of this application further provides a computer-readable storage medium, the computer-readable storage medium stores computer executable instructions, and when the instructions are executed by a processor, the steps of the playback control method are implemented.

The foregoing describes a schematic solution of the computer-readable storage medium in this embodiment. It should be noted that, the technical solution of the storage medium and the technical solution of the playback control method belong to a same concept. For details not described in detail in the technical solution of the storage medium, refer to the descriptions of the technical solution of the playback control method.

An embodiment of this application further provides a computer program product, and when the computer program product is executed in a computer, the computer is enabled to perform the steps of the playback control method.

The foregoing describes a schematic solution of the computer program product in this embodiment. It should be noted that, the technical solution of the computer program product and the technical solution of the playback control method belong to a same concept. For details not described in detail in the technical solution of the computer program product, refer to the descriptions of the technical solution of the playback control method.

Exemplary embodiments of this application are described above. Other embodiments fall within the scope of the appended claims. In some situations, the actions or steps recorded in the claims can be performed in an order different from the order in the embodiments and the desired results can still be achieved. In addition, the process depicted in the accompanying drawings does not necessarily require the shown particular order or consecutive order to achieve the desired results. In some implementations, multi-task processing and parallel processing can or may be advantageous.

The computer instructions include computer program product code. The computer program product code may be in a source code form, an object code form, an executable file form, an intermediate form, or the like. The computer-readable medium may include any entity or apparatus, a recording medium, a USB flash drive, a removable hard disk, a magnetic disk, an optical disc, a computer memory, a read-only memory (ROM), a random access memory (RAM), an electrical carrier signal, a telecommunications signal, a software distribution medium, and the like that can carry the computer program product code. It should be noted that, content included in the computer-readable medium may be appropriately added or deleted according to the demands of legislation and patent practice in a jurisdiction, for example, in some jurisdictions, according to legislation and patent practice, the computer-readable medium includes neither an electrical carrier signal nor a telecommunications signal.

It should be noted that, for ease of description, the foregoing method embodiments are described as a combination of a series of actions. However, a person skilled in the art should understand that the embodiments of this application are not limited to the described action sequence, because according to the embodiments of this application, some steps may be performed in another sequence or simultaneously. In addition, a person skilled in the art should also understand that the described embodiments in this application are all exemplary embodiments, and involved actions and modules are not necessarily mandatory to the embodiments of this application.

In the foregoing embodiments, descriptions of the embodiments have respective focuses. For a part that is not described in detail in some embodiments, refer to related descriptions in another embodiment.

The embodiments of this application disclosed above are merely intended to help describe this application. The optional embodiments do not describe all details, and the present invention is not limited to the specific implementations. Clearly, many modifications and changes may be made based on the content of the embodiments of this application. These embodiments are selected and described in this application to better explain the principle and the actual applications of the embodiments of this application, so that a person skilled in the art can better understand and use this application. This application is only subjected to the claims and the scope and equivalents thereof.

What is claimed is:

1. A method, comprising:
receiving a playback rate control instruction submitted by a user for a to-be-processed multimedia resource;
obtaining location coordinates of any two adjacent control points carried in the playback rate control instruction in a location coordinate system established on a multimedia resource processing interface, wherein the control point is used to control a playback rate of a corresponding resource frame in the to-be-processed multimedia resource;
determining playback control coordinates of the any two adjacent control points in a plane rectangular coordinate system, comprising:
performing coordinate conversion on the location coordinates of the any two adjacent control points to convert the location coordinates of the any two adjacent control points in the location coordinate system established on the multimedia resource processing interface into the playback control coordinates of the any two adjacent control points in the plane rectangular coordinate system, wherein a horizontal coordinate of the playback control coordinates represents time and a vertical coordinate of the playback control coordinates represents a playback rate of the respective control point;
calculating playback control coordinates of a preset quantity of virtual control points between the any two adjacent control points based on the playback control coordinates of the any two adjacent control points; and
determining the any two adjacent control points respectively as a start point and an end point, and drawing a playback rate control curve of a multimedia resource segment between the any two adjacent control points based on the start point, the end point, and the playback control coordinates of the preset quantity of virtual control points.

2. The method according to claim 1, wherein determining the playback control coordinates of the any two adjacent control points in the plane rectangular system comprises:
establishing the plane rectangular coordinate system with a lower boundary of a multimedia resource processing interface as a horizontal axis and a straight line that is perpendicular to the horizontal axis and passes through a first control point of the any two adjacent control points as a vertical axis;
determining playback control coordinates of the first control point in the plane rectangular coordinate system, and determining a coordinate conversion relationship of a control point based on location coordinates and the playback control coordinates of the first control point; and
calculating playback control coordinates of a second control point of the any two adjacent control points based on the coordinate conversion relationship and location coordinates of the second control point.

3. The method according to claim 1, wherein calculating the playback control coordinates of the preset quantity of virtual control points between the any two adjacent control points comprises:
calculating, based on playback control coordinates of a first control point and a second control point of the any two adjacent control points, playback control coordinates of a first virtual control point and a second virtual control point that are located between the first control point and the second control point.

4. The method according to claim 3, wherein calculating the playback control coordinates of the first virtual control point and the second virtual control point that are located between the first control point and the second control point comprises:
calculating a horizontal coordinate of the first virtual control point based on a difference between horizontal coordinates of the playback control coordinates of the second control point and the first control point, and determining a vertical coordinate of the first virtual control point based on a vertical coordinate of the playback control coordinates of the first control point; and
calculating a horizontal coordinate of the second virtual control point based on the difference between the horizontal coordinates of the playback control coordinates of the second control point and the first control point, and determining a vertical coordinate of the second virtual control point based on a vertical coordinate of the playback control coordinates of the second control point.

5. The method according to claim 4, wherein the playback control coordinates of the second virtual control point are determined by:
calculating a product of a second preset ratio threshold and the difference as a horizontal coordinate of the second virtual control point, and determining a vertical coordinate of the playback control coordinates of the second control point as a vertical coordinate of the second virtual control point.

6. The method according to claim 3, wherein the playback control coordinates of the first virtual control point are determined by:
calculating a difference between horizontal coordinates of the playback control coordinates of the second control point and the first control point; and
calculating a product of a first preset ratio threshold and the difference as a horizontal coordinate of the first virtual control point, and determining a vertical coordinate of the playback control coordinates of the first control point as a vertical coordinate of the first virtual control point.

7. The method according to claim 1, wherein drawing the playback rate control curve of the multimedia resource segment between the any two adjacent control points based on the start point, the end point, and the playback control coordinates of the preset quantity of virtual control points comprises:
drawing, based on the start point, the end point, and the playback control coordinates of the preset quantity of virtual control points, a Bézier curve corresponding to the multimedia resource segment between the any two adjacent control points, and
splicing and displaying each Bézier curve.

8. The method according to claim 7, wherein drawing, based on the start point, the end point, and the playback control coordinates of the preset quantity of virtual control points, the Bezier curve corresponding to the multimedia resource segment between the any two adjacent control points comprises:
   substituting the playback control coordinates of the any two adjacent control points and the preset quantity of virtual control points between the any two adjacent control points into a third-order Bézier curve function, to obtain the Bézier curve corresponding to the multimedia resource segment between the any two adjacent control points.

9. A computing device, comprising:
a processor; and
a memory, wherein the memory stores computer executable instructions that, when executed by the processor, cause the processor to:
   receive a playback rate control instruction submitted by a user for a to-be-processed multimedia resource;
   obtain location coordinates of any two adjacent control points carried in the playback rate control instruction in a location coordinate system established on a multimedia resource processing interface, wherein the control point is used to control a playback rate of a corresponding resource frame in the to-be-processed multimedia resource;
   determine playback control coordinates of the any two adjacent control points in a plane rectangular coordinate system, comprising:
      performing coordinate conversion on the location coordinates of the any two adjacent control points to convert the location coordinates of the any two adjacent control points in the location coordinate system established on the multimedia resource processing interface into the playback control coordinates of the any two adjacent control points in the plane rectangular coordinate system, wherein a horizontal coordinate of the playback control coordinates represents time and a vertical coordinate of the playback control coordinates represents a playback rate of the respective control point;
   calculate playback control coordinates of a preset quantity of virtual control points between the any two adjacent control points based on the playback control coordinates of the any two adjacent control points; and
   determine the any two adjacent control points respectively as a start point and an end point, and draw a playback rate control curve of a multimedia resource segment between the any two adjacent control points based on the start point, the end point, and the playback control coordinates of the preset quantity of virtual control points.

10. The computing device according to claim 9, wherein determining the playback control coordinates of the any two adjacent control points in the plane rectangular system comprises:
   establishing the plane rectangular coordinate system with a lower boundary of a multimedia resource processing interface as a horizontal axis and a straight line that is perpendicular to the horizontal axis and passes through a first control point of the any two adjacent control points as a vertical axis;
   determining playback control coordinates of the first control point in the plane rectangular coordinate system, and determining a coordinate conversion relationship of a control point based on location coordinates and the playback control coordinates of the first control point; and
   calculating playback control coordinates of a second control point of the any two adjacent control points based on the coordinate conversion relationship and location coordinates of the second control point.

11. The computing device according to claim 9, wherein calculating the playback control coordinates of the preset quantity of virtual control points between the any two adjacent control points comprises:
   calculating, based on playback control coordinates of a first control point and a second control point of the any two adjacent control points, playback control coordinates of a first virtual control point and a second virtual control point that are located between the first control point and the second control point.

12. The computing device according to claim 11, wherein calculating the playback control coordinates of the first virtual control point and the second virtual control point that are located between the first control point and the second control point comprises:
   calculating a horizontal coordinate of the first virtual control point based on a difference between horizontal coordinates of the playback control coordinates of the second control point and the first control point, and determining a vertical coordinate of the first virtual control point based on a vertical coordinate of the playback control coordinates of the first control point; and
   calculating a horizontal coordinate of the second virtual control point based on the difference between the horizontal coordinates of the playback control coordinates of the second control point and the first control point, and determining a vertical coordinate of the second virtual control point based on a vertical coordinate of the playback control coordinates of the second control point.

13. The method according to claim 12, wherein the playback control coordinates of the second virtual control point are determined by:
   calculating a product of a second preset ratio threshold and the difference as a horizontal coordinate of the second virtual control point, and determining a vertical coordinate of the playback control coordinates of the second control point as a vertical coordinate of the second virtual control point.

14. The computing device according to claim 11, wherein the playback control coordinates of the first virtual control point are determined by:
   calculating a difference between horizontal coordinates of the playback control coordinates of the second control point and the first control point; and
   calculating a product of a first preset ratio threshold and the difference as a horizontal coordinate of the first virtual control point, and determining a vertical coordinate of the playback control coordinates of the first control point as a vertical coordinate of the first virtual control point.

15. The computing device according to claim 9, wherein drawing the playback rate control curve of the multimedia resource segment between the any two adjacent control points based on the start point, the end point, and the playback control coordinates of the preset quantity of virtual control points comprises:

drawing, based on the start point, the end point, and the playback control coordinates of the preset quantity of virtual control points, a Bézier curve corresponding to the multimedia resource segment between the any two adjacent control points, and splicing and displaying each Bézier curve.

16. The computing device according to claim 15, wherein drawing, based on the start point, the end point, and the playback control coordinates of the preset quantity of virtual control points, the Bézier curve corresponding to the multimedia resource segment between the any two adjacent control points comprises:

substituting the playback control coordinates of the any two adjacent control points and the preset quantity of virtual control points between the any two adjacent control points into a third-order Bézier curve function, to obtain the Bézier curve corresponding to the multimedia resource segment between the any two adjacent control points.

17. A non-transitory computer-readable storage medium storing computer instructions that, when executed by a processor, cause the processor to:

receive a playback rate control instruction submitted by a user for a to-be-processed multimedia resource;

obtain location coordinates of any two adjacent control points carried in the playback rate control instruction in a location coordinate system established on a multimedia resource processing interface, wherein the control point is used to control a playback rate of a corresponding resource frame in the to-be-processed multimedia resource;

determine playback control coordinates of the any two adjacent control points in a plane rectangular coordinate system, comprising:

performing coordinate conversion on the location coordinates of the any two adjacent control points to convert the location coordinates of the any two adjacent control points in the location coordinate system established on the multimedia resource processing interface into the playback control coordinates of the any two adjacent control points in the plane rectangular coordinate system, wherein a horizontal coordinate of the playback control coordinates represents time and a vertical coordinate of the playback control coordinates represents a playback rate of the respective control point;

calculate playback control coordinates of a preset quantity of virtual control points between the any two adjacent control points based on the playback control coordinates of the any two adjacent control points; and determine the any two adjacent control points respectively as a start point and an end point, and draw a playback rate control curve of a multimedia resource segment between the any two adjacent control points based on the start point, the end point, and the playback control coordinates of the preset quantity of virtual control points.

* * * * *